US009301175B2

(12) United States Patent
Nam et al.

(10) Patent No.: US 9,301,175 B2
(45) Date of Patent: Mar. 29, 2016

(54) CONFIGURATION OF INTERFERENCE MEASUREMENT RESOURCES FOR ENHANCED DOWNLINK MEASUREMENTS AND MU-MIMO

(71) Applicant: Samsung Electronics Co., LTD, Suwon-si, Gyeonggi-do (KR)

(72) Inventors: Young-Han Nam, Plano, TX (US); Krishna Sayana, San Jose, CA (US); Boon Loong Ng, Dallas, TX (US); Younsun Kim, Seongnam-shi (KR); Yan Xin, Princeton, NJ (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 212 days.

(21) Appl. No.: 14/067,689

(22) Filed: Oct. 30, 2013

(65) Prior Publication Data
US 2014/0126402 A1 May 8, 2014

Related U.S. Application Data

(60) Provisional application No. 61/722,021, filed on Nov. 2, 2012, provisional application No. 61/756,911, filed on Jan. 25, 2013.

(51) Int. Cl.
*H04W 4/00* (2009.01)
*H04W 24/08* (2009.01)
*H04B 7/04* (2006.01)

(52) U.S. Cl.
CPC ............. *H04W 24/08* (2013.01); *H04B 7/0413* (2013.01)

(58) Field of Classification Search
CPC . H04W 72/0426; H04B 7/0456; H04B 7/024; H04L 5/0057; H04L 5/0048
See application file for complete search history.

(56) References Cited

U.S. PATENT DOCUMENTS 9,083,479 B2 * 7/2015 Etemad et al.
2005/0002468 A1 1/2005 Walton et al.
(Continued)

FOREIGN PATENT DOCUMENTS

WO WO 2011/122833 A2 10/2011
WO WO 2012/099319 A1 7/2012

OTHER PUBLICATIONS

International Search Report issued on Feb. 13, 2014 in connection with International Application No. PCT/KR2013/009900, 4 pages.
(Continued)

*Primary Examiner* — Melanie Jagannathan

(57) ABSTRACT

Apparatuses and methods for indicating and performing interference measurements. A method for performing interference measurements includes identifying a CSI-IM configuration for the UE to perform interference measurement. The method includes determining whether the CSI-IM configuration includes a subset of a total number of frequency resources configured for CSI-IM in the wireless communication system. The method includes measuring interference based on the identified CSI-IM configuration. Additionally, the method includes sending feedback based on the measured interference. The method for performing interference measurements may also include determining whether to perform interference measurements based on all downlink subframes or only a portion of the downlink subframes. Additionally, the method may include performing interference measurement based on the subframe determination.

16 Claims, 7 Drawing Sheets

(56) References Cited

U.S. PATENT DOCUMENTS

| | | |
|---|---|---|
| 2010/0106828 A1 | 4/2010 | Palanki et al. |
| 2012/0213261 A1 | 8/2012 | Sayana et al. |
| 2013/0088986 A1* | 4/2013 | Xiao et al. .................... 370/252 |
| 2014/0092878 A1* | 4/2014 | Davydov et al. .............. 370/336 |
| 2014/0211873 A1* | 7/2014 | Park et al. ..................... 375/267 |
| 2014/0334391 A1* | 11/2014 | Khoshnevis et al. ......... 370/329 |
| 2015/0124663 A1* | 5/2015 | Chen et al. .................... 370/278 |

OTHER PUBLICATIONS

Written Opinion of the International Searching Authority on Feb. 13, 2014 in connection with International Application No. PCT/KR2013/009900, 4 pages.

* cited by examiner

CONFIGURATION OF INTERFERENCE MEASUREMENT RESOURCES FOR ENHANCED DOWNLINK MEASUREMENTS AND MU-MIMO

CROSS-REFERENCE TO RELATED APPLICATION(S) AND CLAIM OF PRIORITY

The present application claims priority to U.S. Provisional Patent Application Ser. No. 61/722,021, filed Nov. 2, 2012, entitled "Configuration of Interference Measurement Resources for Enhanced Downlink Measurements and MU-MIMO" and U.S. Provisional Patent Application Ser. No. 61/756,911, filed Jan. 25, 2013, entitled "Interference Measurement for Advanced Wireless Communication Systems". The contents of both of the above-identified patent documents are incorporated herein by reference.

TECHNICAL FIELD

The present application relates generally to interference present on signals transmitted and received in a wireless communication system and, more specifically, to configuration of resources to perform interference measurements in a wireless communication system.

BACKGROUND

In Release-10 specification of long term evolution (LTE) wireless communication standard, the user equipment (UE) feedbacks a channel quality indication (CQI) in addition to a precoding matrix index (PMI) and rank indicator, which correspond to a supported modulation and coding scheme (MCS) level that can be supported reliably by the UE, with a certain target error probability. The feedback designs in Release-10 are designed for single-user multiple-input multiple-output (MIMO) communication techniques.

Multi-user (MU) MIMO corresponds to a transmission scheme, where a transmitter transmits data to two or more UEs using the same time/frequency resource by relying on spatial separation of the corresponding user's channels. With support of up to four transmit (Tx) antennas, transmission scheme designs are typically designed for MU-MIMO support for the case of two user MU-MIMO transmissions with a single stream per each UE.

Accordingly, there is a need for improved communication techniques and standards for supporting MU-MIMO.

SUMMARY

Embodiments of the present disclosure provide configuration of interference measurement resources for enhanced downlink measurements and MU-MIMO.

In one exemplary embodiment, a method for performing interference measurements by a UE is provided. The method includes identifying a CSI-IM configuration for the UE to perform interference measurement. The method also includes determining whether the CSI-IM configuration includes a subset of a total number of frequency resources configured for CSI-IM in the wireless communication system. The method includes measuring interference based on the identified CSI-IM configuration. Additionally, the method includes sending feedback based on the measured interference. The method for performing interference measurements may also include determining whether to perform interference measurements based on all downlink subframes or only a portion of the downlink subframes. Additionally, the method may include performing interference measurement based on the subframe determination.

In another exemplary embodiment, an apparatus in a UE capable of performing interference measurements in a wireless communication system is provided. The apparatus includes a controller and a transmitter. The controller is configured to identify a channel state information CSI-IM configuration for the UE to perform interference measurement, determine whether the CSI-IM configuration includes a subset of a total number of frequency resources configured for CSI-IM in the wireless communication system, and measure interference based on the identified CSI-IM configuration. The transmitter is configured to send feedback based on the measured interference.

In yet another exemplary embodiment, a method for signaling interference measurements to be made by a UE in a wireless communication system is provided. The method includes sending a signal indicating a CSI-IM configuration for the UE to perform interference measurement. The CSI-IM configuration includes an indication of whether the UE is to use a subset of a total number of frequency resources configured for CSI-IM in the wireless communication system. Additionally, the method includes receiving feedback based on measured interference associated with the CSI-IM configuration.

In yet another exemplary embodiment, an apparatus for signaling interference measurements to be made by a UE in a wireless communication system is provided. The apparatus includes a transmitter and a receiver. The transmitter is configured to send a signal identifying a CSI-IM configuration for the UE to perform interference measurement. The CSI-IM configuration includes an indication of whether the UE is to use a subset of a total number of frequency resources configured for CSI-IM in the wireless communication system. The receiver is configured to receive feedback based on measured interference associated with the CSI-IM configuration.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
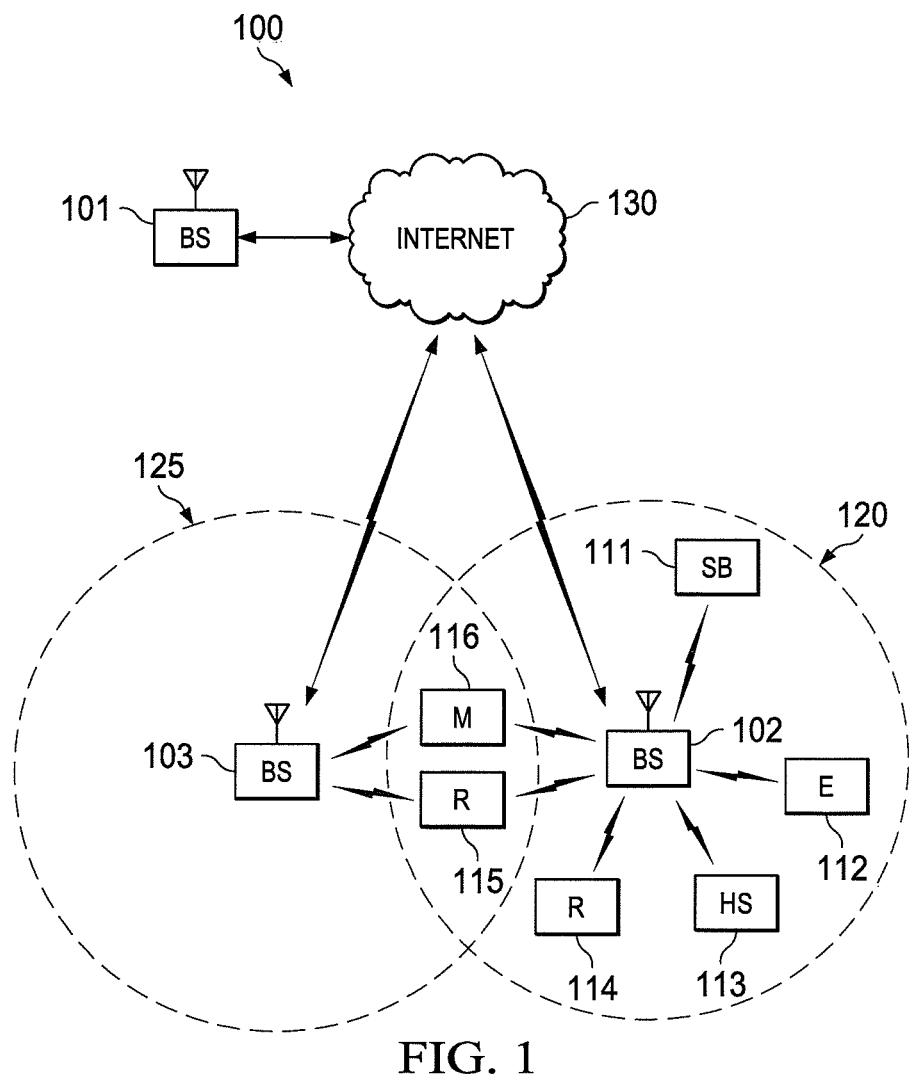
FIG. 1 illustrates an exemplary wireless system which transmits messages in accordance with an illustrative embodiment of the present disclosure.
Figure 2:
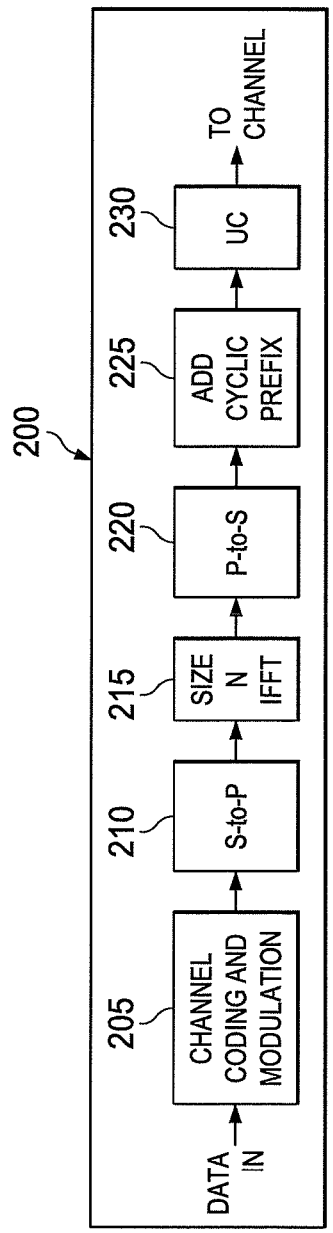
FIG. 2 illustrates a high-level diagram of an orthogonal frequency division multiple access transmit path in accordance with an illustrative embodiment of the present disclosure.
Figure 3:
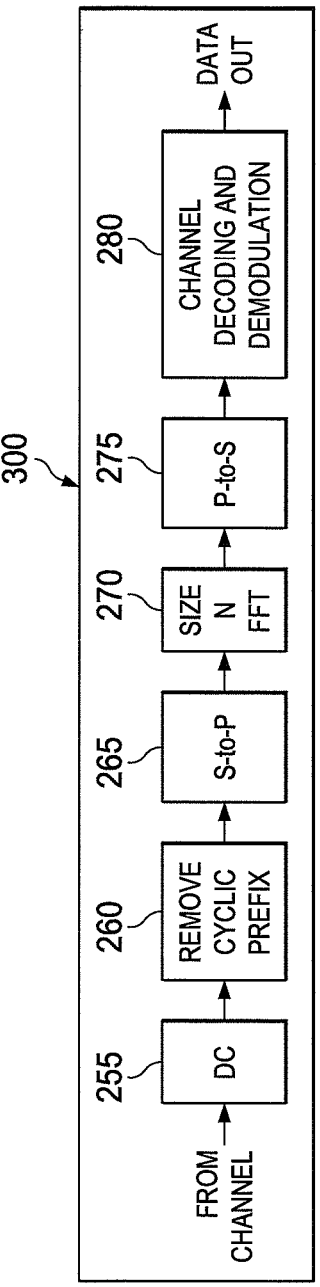
FIG. 3 illustrates a high-level diagram of an orthogonal frequency division multiple access receive path in accordance with an illustrative embodiment of the present disclosure.

FIGS. 1-3 below describe various embodiments implemented in wireless communications systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably-arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to Internet 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via Internet 130. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a user equipment (e.g. user equipment 116 of FIG. 1). In other examples, for uplink communication, the receive path circuitry 300 may be implemented in a base station (e.g. base station 102 of FIG. 1) or a relay station, and the transmit path circuitry 200 may be implemented in a user equipment (e.g. user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.); while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to base stations 101-103 and may implement a receive path corresponding to the architecture for receiving in the downlink from base stations 101-103.

Figure 4:
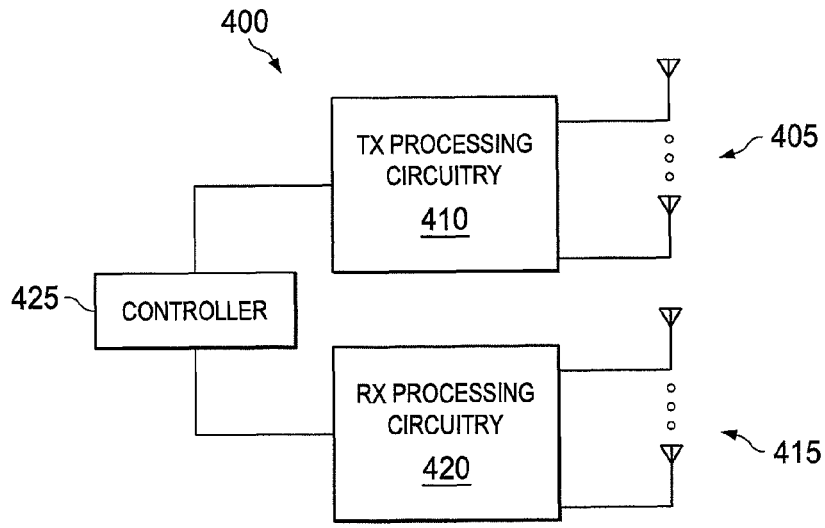
FIG. 4 illustrates a block diagram of a node in a wireless communication system that may be used to implement various embodiments of the present disclosure.

FIG. 4 illustrates a block diagram of a node 400 in a wireless communication system that may be used to implement various embodiments of the present disclosure. In this illustrative example, the node 400 is a device at a communication point in a wireless communications system, such as, for example, wireless system 100 in FIG. 1. The node 400 may be a base station (e.g., eNB, RS, RRH, etc.) or a user equipment (e.g., mobile station, subscriber station, etc.). In one example, the node 400 is an example of one embodiment of the user equipment 116 in FIG. 1. In another example, the node 400 is an example of one embodiment of the base station 102 in FIG. 1. Node 400 comprises transmit (TX) antennas 405, transmit (TX) processing circuitry 410, receive (Rx) antennas 415, receive (Rx) processing circuitry 420, and controller 425.

TX processing circuitry 410 receives analog or digital signals from outgoing baseband data. TX processing circuitry 410 encodes, multiplexes, and/or digitizes the outgoing baseband data to produce a processed RF signal that is transmitted via TX antennas 405. For example, the TX processing circuitry 410 may implement a transmit path that is analogous to the transmit processing circuitry 200 in FIG. 2. TX processing circuitry 410 may also perform spatial multiplexing via layer mapping to different antennas in TX antennas 405 and different ports of antennas in TX antennas 405.

Rx processing circuitry 420 receives from Rx antennas 415 an incoming RF signal or signals transmitted by one or more transmission points, such as base stations, relay stations, remote radio heads, user equipment, etc. Rx processing circuitry 420 processes the received signal(s) to identify the information transmitted by the transmission point(s). For example, the Rx processing circuitry 420 may down-convert the incoming RF signal(s) to produce an intermediate frequency (IF) or a baseband signal by channel estimation, demodulating, stream separating, filtering, decoding, and/or digitizing the received signal(s). For example, the Rx processing circuitry 420 may implement a receive path that is analogous to the receive processing circuitry 300 in FIG. 3.

Controller 425 controls the overall operation of node 400. In one such operation, controller 425 controls the reception of channel signals and the transmission of channel signals by Rx processing circuitry 420 and TX processing circuitry 410, in accordance with well-known principles.

The embodiment of node 400 illustrated in FIG. 4 is for illustration only. Other embodiments of the node 400 could be used without departing from the scope of this disclosure. For example, the antennas in the TX and Rx antenna arrays may overlap or be the same antenna arrays used for transmission and reception via one or more antenna switching mechanisms.

A channel state information (CSI) reference signal (RS) enables channel measurements by a UE. A UE specific CSI-RS configuration includes: 1) a non-zero power (NZP) CSI-RS resource; and 2) one or more zero-power CSI-RS resources. Typically, the non-zero power CSI-RS resource corresponds to the antenna elements/ports of the serving cell. Zero-power (ZP) CSI-RS, also commonly referred to as muted CSI-RS, are used to protect the CSI-RS resources of another cell, and a UE is expected to rate match (skip for decoding/demodulation) around these resources. The following standards documents are incorporated by reference herein: 1) 3GPP TS 36.211 v10.1.0, "E-UTRA, Physical channels and modulation;" 2) 3GPP TS 36.212 v10.1.0, "E-UTRA, Multiplexing and Channel coding;" 3) 3GPP TS 36.213 v10.1.0, "E-UTRA, Physical Layer Procedures;" 4)

RP-111365 Coordinated Multi-Point Operation for LIE WID; 5) 3GPP TS 36.819 V11.0.0 (2011-09); 6) 3GPP TS 36.331 draft version RP-121970; 7) 3GPP 36.213 v11.1.0; and 8) 3GPP TS 36.331 draft version RP-121970.

Additional configuration details of the CSI-RS are specified in 3GPP standards, particularly in 36.211 section 6.10.5 and 36.213 section 7.2.5. A draft version of 36.331 (RP-121970) provides additional configuration details of the NZP CSI-RS configuration. 3GPP 36.213 v11.1.0 describes additional details of CSI-IM resource configuration, particularly in sections 7.2, 7.2.3, & 7.2.6.

In U.S. patent application Ser. No. 13/888,659 entitled "CSI DEFINITIONS AND FEEDBACK MODES FOR COORDINATED MULTI-POINT TRANSMISSION" filed May 9, 2012, which is incorporated by reference herein, the interference measurement procedure captured in Section 7.2.3 of 36.211 is described where IMR refers to CSI-IM resource. In one method, with IMR resource configuration, the reference subframe is based on the intersection of the IMR resource and the CSI subframe subset. This may be achieved by modifying the definition of a valid downlink subframe, for example, as illustrated in FIGS. 9A and 9B of application Ser. No. 13/888,659.

Additional details of CSI-IM are described in a draft version of 36.331 (RP-121970). Additional details regarding the RI reference process are provided in 36.213 v11.1.0, particularly in sections 7.2.1 and 7.2.2. Additional details regarding CSI reference resources are provided in 36.213 v11.1.0, particularly in section 7.2.3.

To support coordinated multipoint (CoMP) transmission, a network uses feedback corresponding to multiple transmission points or cells. As a result, a network may set up multiple CSI-RS resources, each typically corresponding to a transmission point (TP) or CSI process. Unless otherwise stated, the terms "CSI-RS resource," "TP," and "CSI process" may be used interchangeably. Further details of CSI-RS resource configurations and the configurable parameters for each CSI-RS resource may include configuration of multiple non-zero power CSI-RS resources and include at least: AntennaPorts-Count, ResourceConfig, SubframeConfig, $P_c$, and a Parameter X to derive scrambling initialization $c_{init}=2^{10} \cdot (7 \cdot (n_s+1) + l+1) \cdot (2 \cdot X+1) + 2 \cdot X + N_{CP}$. X ranges from 0 to 503 and may be interpreted as virtual cell id. In Release 10, X is the PCI of the serving cell. These parameters are configured per CSI-RS resource. Some parameters may be configured per CSI-RS port considering the decision of supporting coherent joint transmission by the aggregate CSI feedback corresponding to multiple TPs in one CSI-RS resource. While the CSI-RS resources capture channels of individual TPs, the interference measurement also depends on the CoMP scheme. In Releases 8-10, a single interference measurement resource is used, which is the cell-specific reference signal (CRS) itself. Interference measurement on CRS captures all the interference outside the cell.

For CoMP, one or more interference measurement resources may be defined to capture the interference for a hypothetical CoMP scheme. At least one Interference Measurement Resource (IMR) (also referred to as a CSI-interference measurement (IM) resource or CSI-IM resource) may be configured for a Release-11 UE. A maximum of only one or multiple IMRs may be configured for a Release-11 UE. Each IMR may consist of only REs, which may be configured as Release 10 CSI-RS resources.

For IMR configuration, each IMR may be configured independently with a Release-10 subframeConfig and a Release-10 resourceConfig, where resourceConfig is for 4 REs. All the IMRs configured for one UE may together use only REs which may be configured as a single R10 ZP CSI-RS resource configuration. To be consistent with the terminology used by the specification, the present disclosure refers to the IMR resources as CSI-IM resources (i.e., CSI resources for interference measurement).

Embodiments of the present disclosure provide various methods to use the defined CSI-IM resources to capture co-channel interference, multi user interference, and/or frequency selective interference. These CSI-IM resources were originally designed for capturing different hypothesis of inter-TP/inter-cell interference that is used for reporting CSI to aid the CoMP scheduling decisions. In wireless networks, the network utilizes the UEs' CSI to schedule time-frequency resources and to select precoders and MCSs for each individual UE. To facilitate the UEs' CSI estimation, the network may configure and transmit CSI reference signals (RS) as described above. At the same time, each UE may be configured to feedback estimated precoding matrix information (PMI), channel quality information (CQI) and rank information (RI), by receiving and processing the CSI-RS. Further, in Release-11, a new type of reference resources, namely CSI-IM resources, are introduced for interference measurements. With one or more interference measurement resources (e.g., CSI-IM) supported for CoMP, CSI measurement is based on both a CSI-RS resource and a CSI-IM resource. Hence, to set up feedback, a CSI process is defined. Each CSI process is defined with an associated (CSI-RS resource, CSI-IM resource) pair.

Embodiments of the present disclosure recognize that with MU-MIMO, the MCS to be used by the scheduler for each user needs to be determined at the eNB; the MCS that may be supported reliably for each UE is dependent on co-channel PMI corresponding to the co-scheduled UE; and that, on the other hand, for scheduling flexibility, a transmitter may pair a UE with any other UE. Accordingly, embodiments of the present disclosure provide methods to compute MU-CQI at the UE. As such, the reported MU-CQI allows better prediction at the eNB. Embodiments of the present disclosure recognize that relying completely on eNB predictions of MCS may not be accurate, since the receiver implementation specific algorithms, such as interference cancellation/suppression, also need to be accurately reflected in any MU-CQI calculation.

Embodiments of the present disclosure recognize that the CSI-IM are transmitted in a time and frequency pattern and represent interference that may be flat over time and frequency. For example, the network reflects interference from one or more transmission points/sites in the system. It is left to the UE implementation to determine how the interference is averaged over the subframes and subbands. Accordingly, embodiments of the present disclosure provide methods to reuse CSI-IM resources to achieve UE interference measurements for MU-CQI purposes.

Figure 5:
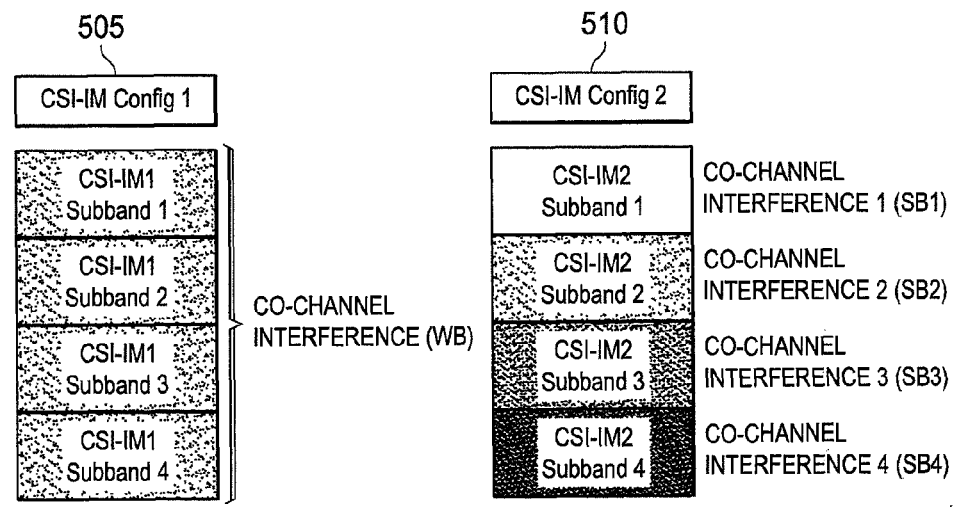
FIG. 5 illustrates CSI-IM configurations in accordance with the various embodiments of the present disclosure.

FIG. 5 illustrates CSI-IM configurations in accordance with the various embodiments of the present disclosure. CSI-IM Config 1 505 illustrates multiple configured CSI-IM resources across multiple subbands representing the entire frequency band. The UE may utilize the multiple CSI-IM resources configured across multiple subbands to perform wideband (WB) co-channel interference measurements. CSI-IM Config 2 510 illustrates configured CSI-IM resources in various subband sets across the entire frequency band. In various embodiments, the UE is configured (e.g., by the eNB) for interference measurement using a set of the total configured CSI-IM resources across the entire frequency band. For example, the UE may only use frequency resources present in one or more subbands to perform subband (SB) co-channel interference measurements.

Figure 6:
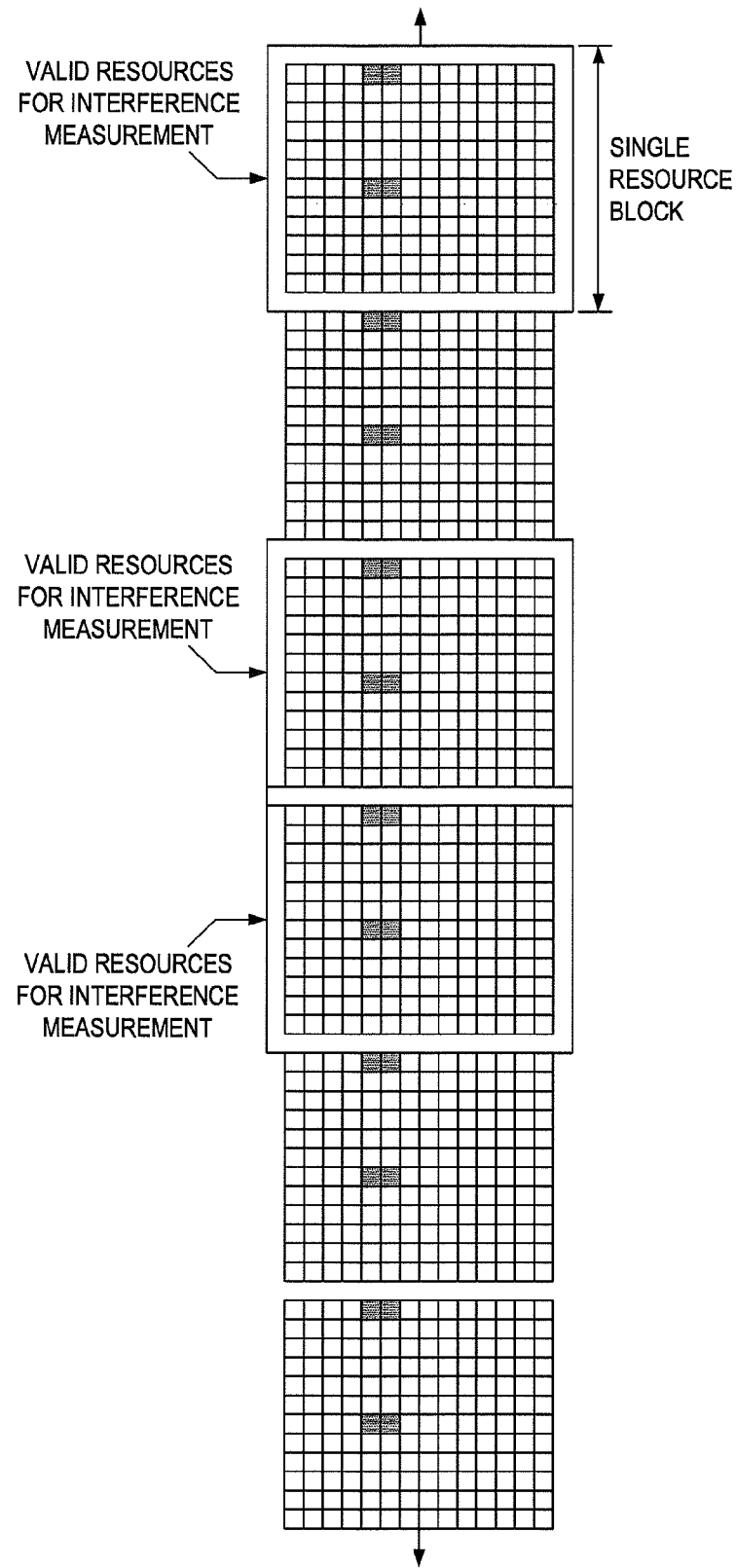
FIG. 6 illustrates configured CSI-IM resource elements in resource blocks in accordance with various embodiments of the present disclosure.

FIG. 6 illustrates configured CSI-IM resource elements in resource blocks in accordance with various embodiments of the present disclosure. A CSI-IM resource configuration as defined in Release-11 spans the entire frequency band and occurs periodically in certain subframes. It is left to the UE implementation to determine how to average the interference measurements based on the CSI-IM resources. For example, when CSI-RS resource configuration 0 is configured, the UE is configured with each of the shaded CSI-IM resources illustrated in FIG. 6 across the downlink system bandwidth. In this illustrative example, four REs are present in each RB for configuration 0. Other configurations have the same density of resources per RB but with different locations (i.e., resource configuration) within the RB grid.

Figure 7:
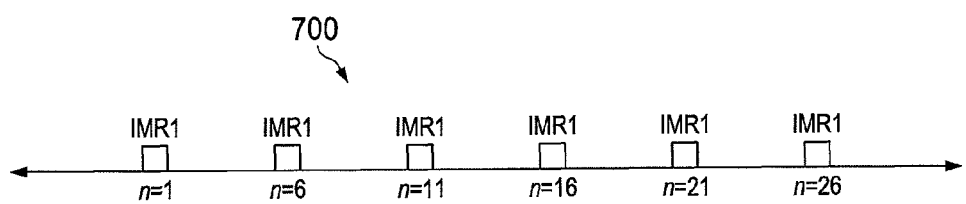
FIG. 7 illustrates a subframe configuration for CSI-IM resources in accordance with various embodiments of the present disclosure.

FIG. 7 illustrates a subframe configuration 700 for CSI-IM resources in accordance with various embodiments of the present disclosure. In this illustrative embodiment, a subframe configuration (i.e., additional subframe timing associated with IMRs) is illustrated, which corresponds to the subframe period of 5 ms and the subframe offset of 1 ms.

In various embodiments of the present disclosure, a resource configuration (e.g., a restriction on the total number of configured resources) is defined in frequency for measurements based on CSI-IM. The resource configuration corresponds to a set of valid frequency resources over which the CSI-IM resources may be used by the UE to perform interference measurements. In an illustrative example, information of the set one or more valid frequency locations is included as part of a CSI process configuration. Such one or more frequency locations determine the locations where CSI-IM resources may be used for the purpose of CSI derivation.

For example, as illustrated in FIG. 6, the CSI-IM resource configuration for the UE may be those CSI-IM resources located in the RBs labeled as valid resources for interference measurement. In one exemplary embodiment, the information related to one or more frequency locations is the set of subbands where the CSI-IM resource must be derived from for CSI measurement. Supported subband sizes (k) based on the system bandwidth are provided in Table 7.2.1-3 of 36.213 v 10.0. Resource restriction in frequency for measurements may provide many benefits. A key reason is when the network anticipates the heavier load in certain bands compared to others due to deployment of certain devices (e.g., deployment of MTC devices in the center 6 RBs or fixed assignments of ePDCCH search space for a set of UEs) in these bands or due to fixed or persistent assignments of certain physical channels in certain locations.

In various embodiments of the present disclosure, the information related to one or more frequency locations is signaled as part of downlink control information (DCI) configuration. In one embodiment, the downlink control information (DCI) may be used to signal a selection between one or more configurations, each of which correspond information related to one or more frequency locations. Exemplary DCI signaling CSI-IM resource configuration indications are illustrated in Table 1.

TABLE 1

| DCI bit-field value | CSI-IM Resource Configuration |
| --- | --- |
| 0 | First set of frequency locations of a CSI-IM configuration configured by higher layers |
| 1 | Second set of frequency locations of a CSI-IM configuration configured by higher layers |

In one embodiment, the DCI format used may be DCI format 0 or 4 or a similar DCI format which includes an uplink grant and is used to trigger an associated aperiodic CSI feedback on the uplink. An aperiodic CSI feedback may be associated with feedback of one or more CSI processes. In such a case, the DCI bit-field may indicate resource restrictions per CSI process or a single resource restriction for all CSI processes.

In various embodiments of the present disclosure, for feedback modes that include subband feedback (e.g., feedback of subband CQI), the UE measures the interference measurements based on the corresponding subband on which a subband CQI is reported. The PUSCH and PUCCH based feedback modes supported in Release-10 LTE are described in Tables 7.2.1-1 and 7.2.2-1 of 36.213 v 10.0.

The CSI reference resource is defined as follows in the frequency domain. The CSI reference resource is defined by the group of downlink physical resource blocks corresponding to the band to which the derived CQI value relates. However, the interference measurements at the UE may assume that the interference behavior on CSI-IM resources is statistically similar across the whole bandwidth as opposed to the channel measurements. In one example, whether to perform subband-based interference measurements or not is specifically signaled by an eNB. Such signaling may be higher layer configured or dynamically signaled using a DCI format. In another example, the dynamic signaling of such information is included as part of the aperiodic CSI request in a downlink DCI format (e.g., DCI Format 0 or Format 4).

In various embodiments of the present disclosure, the signal model with MU transmission may be expressed according to Equation 1 below with two transmit antennas and two receive antennas:

$$Y_1 = H_1 V_1 s_1 + H_1 G_1 s_2 + n_1 \quad\quad \text{Equation 1}$$

$$= \begin{bmatrix} h_{11} & h_{21} \\ h_{12} & h_{22} \end{bmatrix} \begin{bmatrix} v_{11} \\ v_{12} \end{bmatrix} s_1 + \begin{bmatrix} h_{11} & h_{21} \\ h_{12} & h_{22} \end{bmatrix} \begin{bmatrix} q_{21} \\ g_{22} \end{bmatrix} s_2 + n_1$$

where $Y_1$ is the received signal at UE1, $H_1$ is the 2×2 MIMO channel matrix at UE1, $V_1$ is the precoder applied for UE1 data symbol $s_1$, $G_1$ is the precoder applied for interfering UE2 data symbol $s_2$, and $n_1$ is the observed AWGN noise at the receiver.

More generally, the signal model may be expressed according to Equation 2 below:

$$Y_1 = H_1 V_1 s_1 + H_1 G_I \vec{s}_I + n_1 \quad\quad \text{Equation 2}$$

where $G_I = [G_1, G_2, \ldots G_{N_I}]$ is the precoding vector corresponding to data symbols that are transmitted to other users $s_I = [s_1, s_2, \ldots s_{N_I}]$.

The most accurate estimate of MU-CQI may be achieved if the transmitter (eNB) and receiver (UE) are aligned on the assumption of co-channel PMI $G_I$. However, with multi-user scheme support at the eNB, a scheduler determines the user grouping for MU transmission based on the channel state feedback received from all UEs, the data requirements of each user, and other fairness metrics. A UE receiver may not exactly predict the co-channel PMI used for MU transmission and, hence, it may not be feasible to exactly account for the co-channel PMI used in the CQI calculation. In one example, one possibility is for the eNB to explicitly indicate such precoder ahead of time for MU-CQI calculation. This method may have some disadvantages. Due to the limitation on amount of signaling overhead that may be supported on the downlink, co-channel PMI may not be able to be indicated often or in a frequency-selective manner. In one embodiment, the co-channel interference is indicated implicitly using CSI-IM resources.

Figure 8:
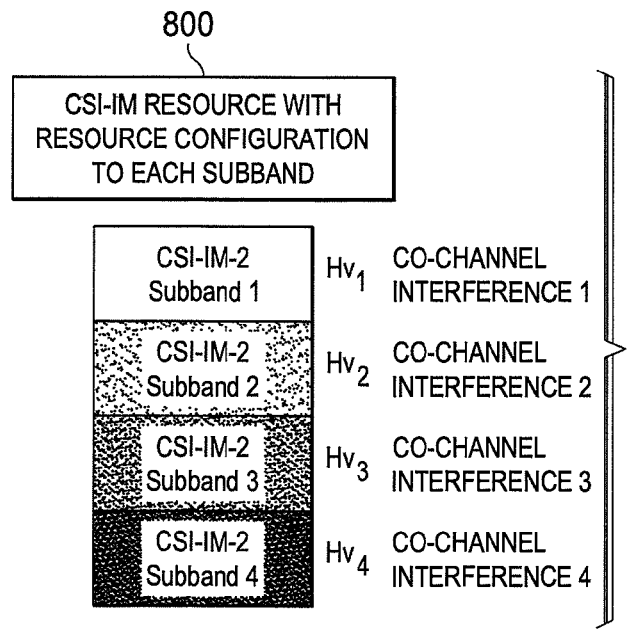
FIG. 8 illustrates a CSI-IM resource configuration with a resource configuration in each subband of a system bandwidth in accordance with various embodiments of the present disclosure.

FIG. 8 illustrates a CSI-IM resource configuration 800 with a resource configuration in each subband of a system bandwidth in accordance with various embodiments of the present disclosure. In this illustrative embodiment, a CSI feedback is based on a CSI process and CSI-IM measurements configured for or restricted to the corresponding subband or subbands in the frequency. The "corresponding subband" is the set of subbands that the CQI feedback relates to in the feedback mode. In one embodiment, whether such configuration or restriction applies is signaled by a higher layer parameter. In one embodiment, this configuration is indicated and/or included as part of the CSI process definition as illustrated in Table 2 below.

TABLE 2

| CSI-Process: |  |
|---|---|
| { |  |
|    CSI-Process-ID | Integer |
|    CSI-RS-config |  |
|    CSI-IM-config |  |
|    (Optional) Flag__Subband__CSI-IM measurement | Boolean |
| } |  |

In one embodiment, the CSI feedback corresponding to such CSI process is reported with a rank configuration or restriction. In one method, the rank of the CSI feedback is configuration or restricted to rank 1. In another example, the rank of such CSI process may be higher layer configured. In another example, whether such a configuration or restriction applies is indicated as part of a periodic or aperiodic feedback mode configuration.

In an exemplary embodiment, as illustrated, for example, in FIG. 5, a first CSI feedback is based on a first CSI process and no resource restriction in frequency (e.g., CSI-IM Config 1 505). A second CSI feedback is based on a second CSI process and CSI-IM measurements configured for or restricted to a corresponding subband in frequency (e.g., CSI-IM Config 2 510). The first CSI feedback is reported along with the reported rank (RI) chosen by the UE. The second CSI feedback is reported with a rank configuration or restriction. In one example, the rank of the second CSI feedback is configured or restricted to rank 1. In another example, the rank of the second process is higher layer configured. In another example, the rank of the second process may be dependent on the rank of the first process. In one example of this embodiment, the second CSI feedback and the first CSI feedback may be sent with the same rank (e.g., rank 1).

In one embodiment, a common PMI is configured between the first and second CSI process (i.e., the second CSI process does not report PMI feedback). In one example, the second CSI process reports the CQI as a delta CQI to the first CSI process. In another example, the first and second CSI processes are reported together (configured together) for an aperiodic CSI feedback mode. In particular, these methods may be used for PUSCH based 3-2 aperiodic feedback mode. It may be difficult to justify PUSCH 3-2 feedback payload without corresponding gains, so a second CSI process may measure MU-CQI. The eNB may obtain accurate CQI using any particular form of precoding (e.g., ZF precoding) since the effect of precoding may be reflected on CSI-IM resources.

In one example, the above embodiments corresponding to two different CSI reports may be implemented as a single joint CSI process to support dynamic MU as illustrated in Table 3 below. In this example, an eNB may reflect co-channel interference on the CSI-IM measurement.

TABLE 3

| CSI-Process-MU: |  |
|---|---|
| { |  |
|    CSI-Process-ID | Integer |
|    CSI-RS-config |  |
|    CSI-IM-config1 |  |
|    CSI-IM-config2 |  |
|    (Optional) MU__flag | Boolean |
|    (Optional) Flag__Subband__CSI-IM-config2 | Boolean |
|    (Optional) Rank__restriction__MU |  |
| } |  |

With this configuration, a first CSI feedback is based on the single (NZP) CSI-RS configuration and CSI-IM config 1. A second CSI feedback suitable for MU is reported based on the single CSI-RS configuration and CSI-IM config 2 with the subband restriction as indicated by the Flag_Subband_CSI-IM-config2. Further, rank restriction is configured by Rank_restriction_MU.

Figure 9:
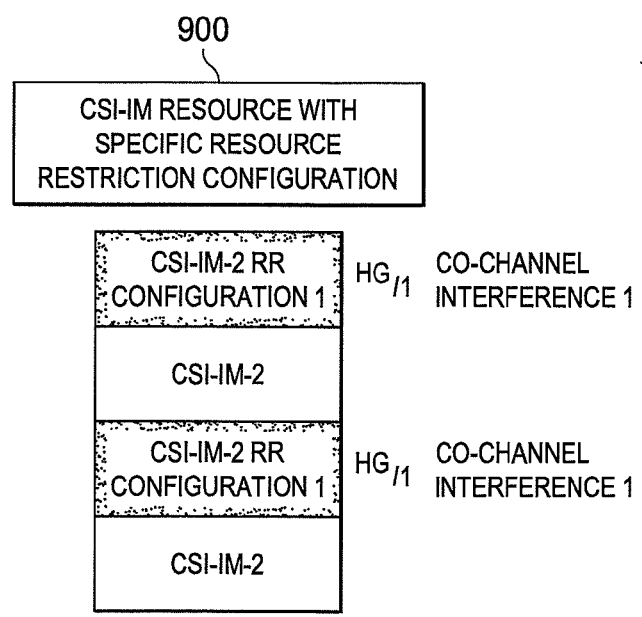
FIG. 9 illustrates a CSI-IM resource configuration with a specific resource restriction configuration in accordance with an illustrative embodiment of the present disclosure.

FIG. 9 illustrates a CSI-IM resource configuration 900 with a specific resource restriction configuration in accordance with an illustrative embodiment of the present disclosure. In this illustrative embodiment, a CSI feedback is based on a CSI process and CSI-IM measurements restricted to a configured set of subbands in frequency, referred to as a resource restriction configuration. In one example, resource restriction configuration is signaled by a higher layer parameter. In one example, this resource restriction configuration is included as part of the CSI process definition as illustrated in Table 4 below.

TABLE 4

| CSI-Process: |  |  |
|---|---|---|
| { |  |  |
|    CSI-Process-ID Integer |  |  |
|    CSI-RS-config |  |  |
|    CSI-IM-config |  |  |
|    (Optional) Reseource__Restriction__configuration__CSI-IM measurement |  | Bitmap |
| } |  |  |

Figure 10:
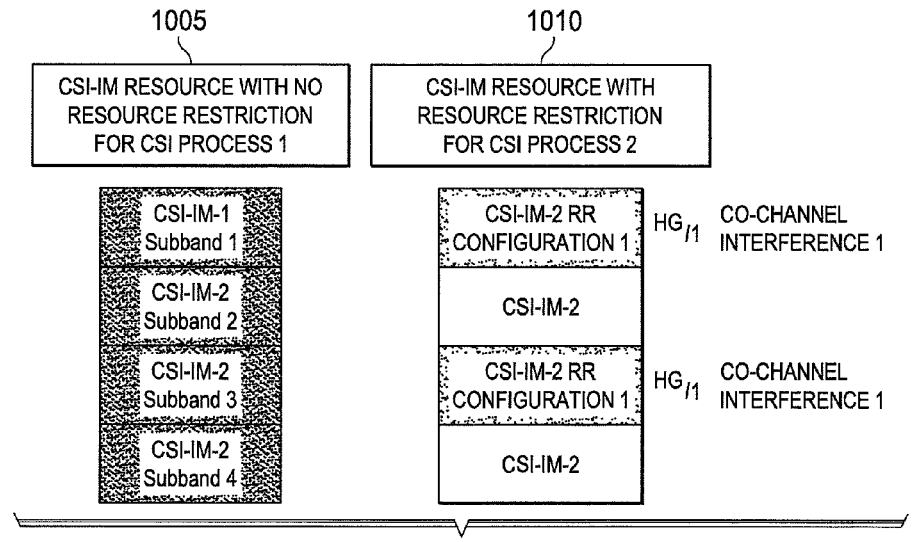
FIG. 10 illustrates a CSI-IM resource configuration with no resource restriction for a first CSI Process and a CSI-IM resource configuration with resource restriction to subband for a second CSI Process in accordance with an illustrative embodiment of the present disclosure.

FIG. 10 illustrates a CSI-IM resource configuration 1005 with no resource restriction for a first CSI Process, and a CSI-IM resource configuration 1010 with resource restriction to subband for a second CSI Process in accordance with an illustrative embodiment of the present disclosure. In this illustrative embodiment, a first CSI feedback is based on a first CSI process and no resource restriction in frequency. A second CSI feedback is based on a second CSI process and CSI-IM measurements restricted to a restricted set of frequency locations (illustrated as resource restriction (RR) configuration). In one example, the restricted set of frequency locations is a set of subbands. The first CSI feedback is reported along with the reported rank (RI) chosen by the UE. The second CSI feedback is reported with a rank restriction. In one method, the rank of the second CSI feedback is restricted to rank 1. In another example, the rank of the second process is higher layer configured. In another example, the rank of the second process is dependent on the rank of the first process.

In one example of this embodiment, the second CSI feedback and the first CSI feedback are sent with the same rank (e.g., rank 1). In another example, a common PMI is configured between the first and second CSI processes, i.e., the second CSI process does not report PMI feedback. In one method, the second CSI process reports the CQI as a delta CQI to the first CSI process. In particular, these examples may be used for PUSCH aperiodic feedback modes, both subband based and wideband based modes. The eNB may obtain accurate CQI using any particular form of precoding (e.g., ZF precoding), since the effect of precoding may be reflected on CSI-IM resources.

In one example, the above embodiments corresponding to two different CSI reports are implemented as two separate CSI processes to support dynamic MU as illustrated in Tables 5 and 6 below. In this example, an eNB may reflect co-channel interference on the CSI-IM measurement.

TABLE 5

CSI-Process1:
{
    CSI-Process-ID                                                                    Integer
    CSI-RS-config
    CSI-IM-config1
    (Optional) MU_flag                                          Boolean
    (Optional) Resource_Restriction_configuration_CSI-IM    Bitmap
    measurement
    (Optional) Rank_restriction_MU
}

TABLE 6

CSI-Process2:
{
    CSI-Process-ID                                                                    Integer
    CSI-RS-config
    CSI-IM-config2
    (Optional) MU_flag                                          Boolean
    (Optional) Resource_Restriction_configuration_CSI-IM    Bitmap
    measurement
    (Optional) Rank_restriction_MU
}

With this configuration, a first CSI feedback is based on the single (NZP) CSI-RS configuration and CSI-IM config 1. A second CSI feedback suitable for MU is reported based on the single CSI-RS configuration and CSI-IM config 2 with the resource restriction for interference measurement as indicated by the Resource_Restriction_configuration_CSI-IM measurement. Further rank restriction is as configured by Rank_restriction_MU.

In various embodiments of the present disclosure, the UE measures the MU interference assuming no receiver processing. In practice, the pilots/reference symbols (RS) corresponding to an interfering UE may be available to a user. An advanced UE receiver may detect and cancel such interference. For example, the signal model after receive processing may be expressed according to Equation 3 below:

$$\vec{w}Y_1 = \vec{w}H_1V_1s_1 + \vec{w}H_1G_I\vec{s}_I + \vec{w}n_1 \quad \text{Equation 3}$$

where $\vec{w}$ are computed based on the channels $H_1V_1$ and $H_1G_I$.

Figure 11:
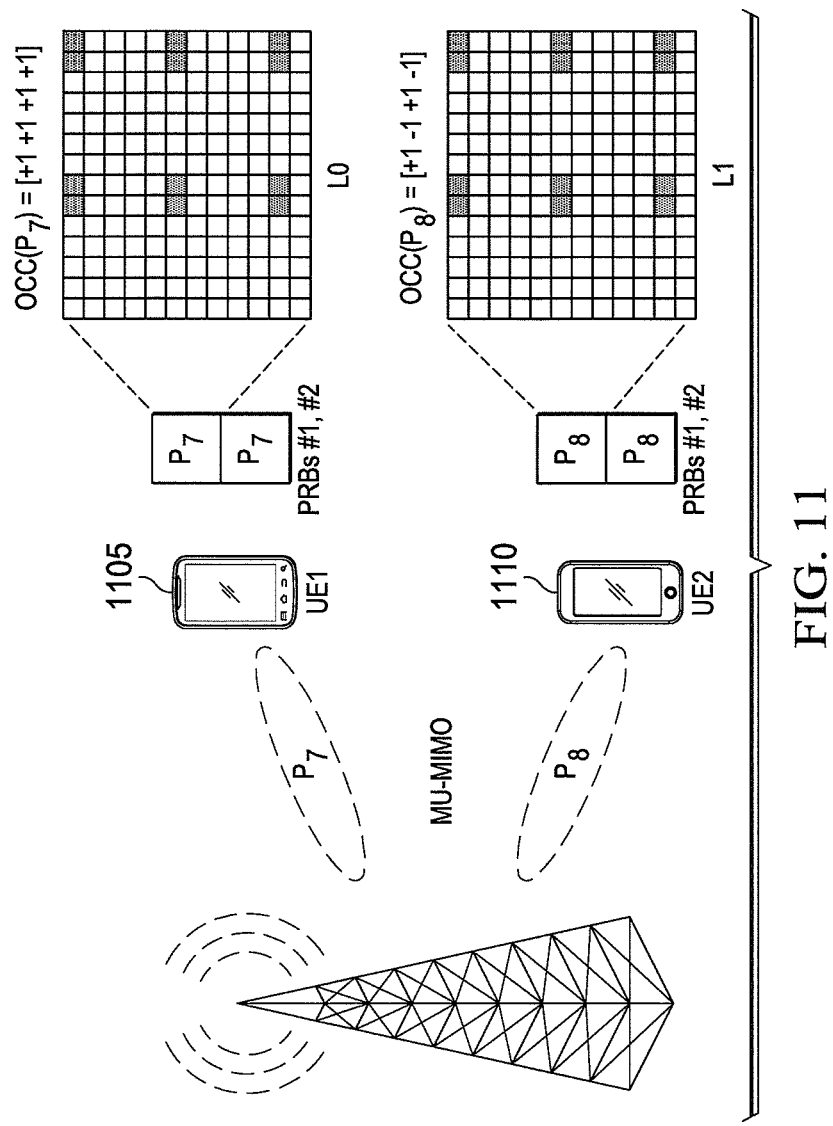
FIG. 11 illustrates MU-MIMO communication with a UE allocated to Port 7 and a UE allocated to Port 8 in accordance with an illustrative embodiment of the present disclosure.

FIG. 11 illustrates MU-MIMO communication with a UE 1105 allocated to Port 7 and a UE 1110 allocated to Port 8 in accordance with an illustrative embodiment of the present disclosure. In actual MU receiver processing, the channel of an interfering MU-UE may be estimated by the UE on the DRMS port that is allocated to an interfering UE. In this illustrative example, a DMRS port 7 is assigned to the UE 1105, and the DMRS port 8 is assigned to an interfering UE 1110.

The present disclosure provides several exemplary implementations to reflect this receiver behavior for accurate MU-CQI estimation. In one example, a CSI feedback is based on, i) a first type non-zero power CSI-RS for channel measurements, ii) second type non-zero power CSI-RS for MU interference measurements, and iii) a CSI-IM for interference measurements. For CSI computation at the UE, the UE treats the first non-zero power CSI-RS as the unprecoded channel for channel measurements. The second non-zero power CSI-RS is treated as a precoded interfering channel ($H_1G_I$) for interference measurements associated with a corresponding DMRS port in a hypothetical PDSCH resource. The CSI-IM is simply treated as an interference that is seen on each hypothetical PDSCH for a UE.

In one embodiment, CSI process definition is modified as follows to include information of the DMRS ports of the self and interfering channels as illustrated in Table 7 below.

TABLE 7

(MU) CSI process definition 1
{
    Non-zero CSI-RS resource configuration of first type;
    Non-zero CSI-RS resource configuration of a second type;
    A CSI-IM configuration;
    (optional) A DMRS port associated with the non-zero CSI-RS resource configuration of first type;
    (optional) A DMRS port associated with the non-zero CSI-RS resource configuration of second type;
}

In one embodiment, CSI process definition includes information on whether the DMRS ports of the self and interfering channels collide or not, as illustrated in Table 8 below. In one example, ports 7 and 8 occupy the same set of time and frequency resources while being separated by CDM. In another example, ports 7 and 8 occupy different sets of time and frequency resources.

TABLE 8

(MU) CSI process definition 2
{
    Non-zero CSI-RS resource configuration of first type;
    Non-zero CSI-RS resource configuration of a second type;
    A CSI-IM configuration;
    (optional) A bit field indicating whether the DMRS port corresponding to non-zero CSI-RS resource configuration of the second type is colliding with the DMRS port corresponding to non-zero CSI-RS resource configuration of first type
}

In one exemplary embodiment, a separate value of Pc is indicated for the non-zero CSI-RS configuration of a second type.

The PUSCH and PUCCH based feedback modes supported in the legacy LTE are described in 36.213 v.10.0.0 and, in particular, in Tables 7.2.1-1 and 7.2.2-1. In Table 7.2.1-1, a new PUSCH CQI feedback mode, mode 3-2, is provided for configuring CSI feedback of higher-layer configured subband CQI and multiple PMI.

In various embodiments, for feedback modes that include subband feedback (e.g., feedback of subband CQI, i.e., PUSCH mode 2-0, 2-2, 3-0, 3-1 and 3-2; and PUCCH mode 2-0 and 2-1), the UE measures the interference measurements based on the corresponding subband on which a subband CQI is reported. Currently, the CSI reference resource is defined as follows in 36.213.

Various embodiments of the present disclosure recognize that, for the interference measurements at a UE, the UE may assume that the interference behavior on CSI-IM resources is statistically similar across the whole bandwidth, as opposed to the channel measurements. Various embodiments of the present disclosure recognize also that subband-restricted interference measurement is useful for MU-MIMO feedback as discussed above with regard to FIG. 8.

Accordingly, various embodiments of the present disclosure provide that whether to perform subband based or full-band based interference measurements may be configured by an eNB. For example, such signaling may be higher layer configured or dynamically signaled using a DCI format. When a UE is configured with transmission mode (TM) 10 and is configured to perform full-band based interference measurement, the UE derives the interference measurements for computing each CQI value reported in uplink subframe n and corresponding to a CSI process, based on only the zero power CSI-RS (e.g., as defined in 36.211 v11.1.0) within the configured CSI-IM resource associated with the CSI process, in the DL system bandwidth (i.e., $N_{RB}^{DL}$). When a UE is configured with TM 10 and is configured to perform subband-based interference measurement, the UE derives the interference measurements for computing each CQI value reported in uplink subframe n and corresponding to a CSI process, based on only the zero power CSI-RS (e.g., as defined in 36.211 v11.1.0) within the configured CSI-IM resource associated with the CSI process, within the subband(s) in which the CQI is derived.

Various embodiments of the present disclosure recognize that time-domain aspects of the interference measurement include that, for a UE in TM 10, the UE derives the interference measurements for computing the CQI value reported in uplink subframe n and corresponding to a CSI process, based on only the zero power CSI-RS within the configured CSI-IM resource associated with the CSI process. If the UE in transmission mode 10 is configured by higher layers for CSI subframe sets $C_{CSI,0}$ and $C_{CSI,1}$, the configured CSI-IM resource within the subframe subset belonging to the CSI reference resource is used to derive the interference measurement.

Various embodiments of the present disclosure recognize that interference measurements may need to be performed in the configured CSI-IM resource across multiple subframes corresponding to the subframe subset. For example, interpolating multiple interference measurements over time provides us reliable interference measurement. On the other hand, if the UE is not allowed to do timing interpolation for the interference reporting (i.e., when the UE is instructed to measure interference within a small set of subframes), eNB may allocate different interfering signals for the UE across different time instances. By doing this, the eNB may identify various CQI values calculated across different interference hypotheses over time. This operation seems to be quite beneficial for MU-MIMO scheduling.

Accordingly, various embodiments of the present disclosure provide that whether to perform time-unrestricted or time-restricted interference measurements may be configured by an eNB. For example, such signaling may be higher layer configured or dynamically signaled using a DCI format. When a UE is configured in TM 10, the UE derives the interference measurements for computing the CQI value reported in uplink subframe n and corresponding to a CSI process, based on only the zero power CSI-RS (e.g., as defined in 36.211 v11.1.0) within the configured CSI-IM resource associated with the CSI process. If the UE in transmission mode 10 is configured by higher layers for CSI subframe sets $C_{CSI,0}$ and $C_{CSI,1}$, the configured CSI-IM resource within the subframe subset belonging to the CSI reference resource is used to derive the interference measurement. When the UE is configured to perform time-restricted interference measurement, the UE measures interference in designated subframes only. When the UE is configured to perform time-unrestricted interference measurement, the UE is allowed to measure interference without any subframe restriction.

Figure 12:
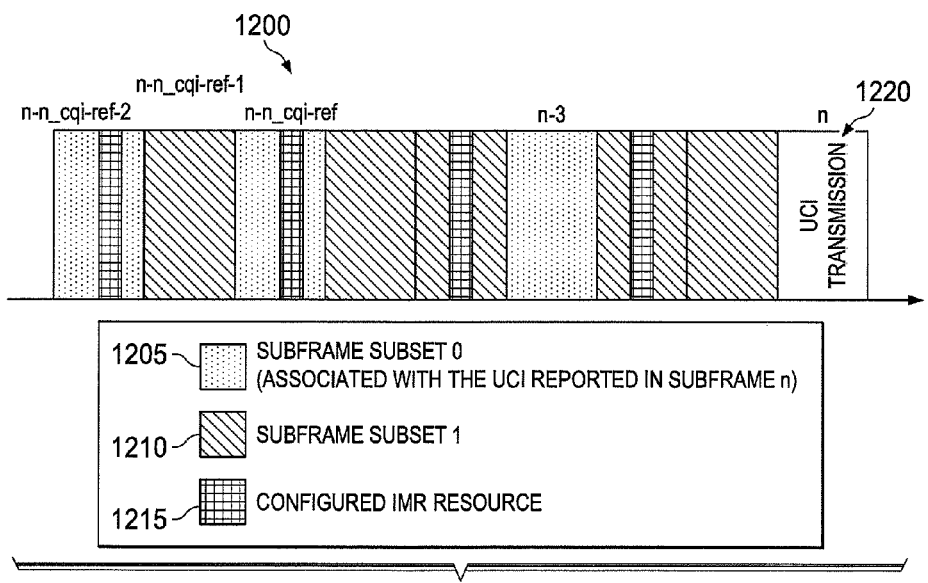
FIG. 12 illustrates subframe transmissions for interference measurement in time-domain in accordance with various embodiments of the present disclosure.

FIG. 12 illustrates subframe transmissions 1200 for interference measurement in time-domain in accordance with various embodiments of the present disclosure. The transmissions 1200 include two subframe subsets 1205 and 1210, CSI-IM resource transmissions 1215, and CQI reporting in uplink subframe n 1220. The UE is configured with two subframe subsets 1205 and 1210, and the UE reports CQI in subframe n 1220, which is associated with subframe subset 0 1205. The CQI reference resource is within subframe $n-n_{CQI\_ref}$ and belongs to subframe subset 0 1205. It is also noted that subframes n−3, $n-n_{CQI\_ref}$, and $n-n_{CQI\_ref}-2$ belong to subframe subset 0 1205, while the other subframes illustrated in FIG. 12 belong to subframe subset 1 1210.

In another example, the designated subframes may correspond to a single subframe, on which CSI reference resource is defined. For example, the CSI reference resource may be defined according to Section 7.2.3 of 36.213 v11.1.0. In FIG. 12, the designated subframe according to this example is subframe $n-n_{CQI\_ref}$.

In another example, the designated subframes correspond to $N_{IMR}$ subframes, where $N_{IMR}$ is (Alt 1) a constant, or (Alt 2) configured in the higher layer (e.g., RRC). For computing the CQI value in subframe n, the $N_{IMR}$ subframes are subframes $n-n_{CQI\_ref}-N_{IMR}+1$, $n-n_{CQI\_ref}-N_{IMR}+2$, . . . , $n-n_{CQI\_ref}$ if subframe subsets are not configured. If subframe subsets are configured, the $N_{IMR}$ subframes are subframe $n-n_{CQI\_ref}$, and $N_{IMR}-1$ more subframes that precedes subframe $n-n_{CQI\_ref}$ in the same subframe subset belonging to the CSI reference resource. For example, if $N_{IMR}=2$ and UCI transmission is as illustrated in FIG. 12, if subframe subsets are not configured, the designated subframe according to this example is subframes $n-n_{CQI\_ref}$ and $n-n_{CQI\_ref}-1$. If subframe subsets are configured, the designated subframe according to this alternative is subframes $n-n_{CQI\_ref}$ and $n-n_{CQI\_ref}-2$.

In one exemplary embodiment, time-restricted and frequency-restricted interference measurements may be jointly configured by an eNB. Such signaling may be higher layer configured or dynamically signaled using a DCI format, which may configure one of the following two states: state 0: time-restricted and frequency-restricted (or subband based) interference measurement, and state 1: time-unrestricted and full-DL bandwidth interference measurement.

In one embodiment, the present disclosure provides to implicitly indicate the co-channel interference using CSI-IM resources and for the UE to calculate MU-CQI taking into account the interference measured in the CSI-IM resources.

In one embodiment, for example, as illustrated in FIG. 8, a CSI feedback is based on a CSI process, and interference measurements are restricted to the corresponding subband or subbands in frequency. The 'corresponding subband(s)' is the set of subbands that the CQI feedback relates to in the feedback mode. Furthermore, the interference measurement may be restricted in the time domain as well as discussed above with regard to FIG. 12.

In one embodiment, whether to apply full-band or subband interference measurement is configured by a higher layer (e.g., RRC) parameter. Each CSI process may convey the parameter. For example, the interference measurement restriction may be independently configured for different CSI processes. In one example, the higher-layer parameter, Flag_Subband_CSI-IM measurement, is included as part of the CSI process definition as illustrated in Table 9 below.

TABLE 9

```
CSI-Process ::=    SEQUENCE {
    csi-ProcessIdentity-r11      CSI-ProcessIdentity-r11,
    csi-RS-IdentityNZP-r11       CSI-RS-IdentityNZP-r11,
    csi-IM-Identity-r11          CSI-IM-Identity-r11,
    p-C-AndAntennaInfoDedList-r11   SEQUENCE   (SIZE (1..2))   OF   P-C-
AndAntennaInfoDed-r11,
    cqi-ReportBothPS-r11         CQI-ReportBothPS-r11         OPTIONAL,   -- Need OR
```

TABLE 9-continued

```
    cqi-ReportPeriodicId-r11    INTEGER (0..maxCQI-Ext-r11)    OPTIONAL,    -- Need OR
    cqi-ReportAperiodicPS-r11   CQI-ReportAperiodicPS-r11      OPTIONAL,    -- Need OR
    Flag_Subband_CSI-IM measurement    Boolean                 OPTIONAL,
    ...
}
```

When Flag_Subband_CSI-IM measurement=1, the interference is measured in the corresponding subband(s); when Flag_Subband_CSI-IM measurement=0, the interference is measured in the full BW.

In one embodiment, whether to apply time-restricted or time-unrestricted interference measurement is configured by a higher layer (e.g., RRC) parameter. Each CSI process may convey the parameter. For example, the interference measurement restriction may be independently configured for different CSI processes. The parameter is configured for each CSI process. In one example, the higher-layer parameter, Flag_TimeRestricted_CSI-IM measurement, is included as part of the CSI process definition as illustrated in Table 10 below.

When Flag_Restricted_CSI-IM measurement=1, time restriction is applied for the interference; when Flag_Restricted_CSI-IM measurement=0, time restriction is not applied.

In another embodiment, whether to apply restricted or non-restricted interference measurement is implicitly configured by a feedback mode. In one example, the restriction applies only in the time domain; and when the interference measurement is restricted, the UE measures interference across the full DL bandwidth in the designated subframes only. In another alternative, the restriction applies only in the frequency domain; and when the interference measurement is restricted, the UE measures interference within the

TABLE 10

```
CSI-Process ::=        SEQUENCE {
    csi-ProcessIdentity-r11     CSI-ProcessIdentity-r11,
    csi-RS-IdentityNZP-r11      CSI-RS-IdentityNZP-r11,
    csi-IM-Identity-r11         CSI-IM-Identity-r11,
    p-C-AndAntennaInfoDedList-r11  SEQUENCE  (SIZE  (1..2))  OF  P-C-
AndAntennaInfoDed-r11,
    cqi-ReportBothPS-r11        CQI-ReportBothPS-r11           OPTIONAL,    -- Need OR
    cqi-ReportPeriodicId-r11    INTEGER (0..maxCQI-Ext-r11)    OPTIONAL,    -- Need OR
    cqi-ReportAperiodicPS-r11   CQI-ReportAperiodicPS-r11      OPTIONAL,    -- Need OR
    Flag_TimeRestricted_CSI-IM measurement    Boolean          OPTIONAL,
    ...
}
```

When Flag_TimeRestricted_CSI-IM measurement=1, time restriction is applied for the interference; when Flag_TimeRestricted_CSI-IM measurement=0, time restriction is not applied.

In one embodiment, whether to apply restricted or unrestricted interference measurement is configured by a higher layer (e.g., RRC) parameter. Each CSI process may convey the parameter. For example, the interference measurement restriction may be independently configured for different CSI processes. When restricted interference measurement applies, the UE measures interference in the restricted resource in both time and frequency domain (i.e., interference is measured in the subband(s) in the designated subframes). In one example, the higher-layer parameter, Flag_Restricted_CSI-IM measurement, is included as part of the CSI process definition as illustrated in Table 11 below.

subband(s) without time restriction. In another example, the restriction applies both in the time and frequency domains, and when the restriction applies, the UE measures interference within the subband(s) in the designated subframes.

In another embodiment, among feedback modes supporting subband CQI feedback (e.g., PUSCH mode 2-0, 2-2, 3-0, 3-1, and 3-2; and PUCCH mode 2-0 and 2-1), restricted interference measurement applies for a first set of feedback modes; and non-restricted interference measurement applies for a second set of feedback modes. For example, for feedback modes associated with UE-selected subband CQI (e.g., PUSCH mode 2-0, 2-2; and PUCCH mode 2-0 and 2-1), the UE applies non-restricted interference measurement. On the other hand, for feedback modes associated with higher-layer configured CQI (i.e., PUSCH mode 3-0, 3-1, and 3-2), restricted interference measurement applies. In another

TABLE 11

```
CSI-Process ::=        SEQUENCE {
    csi-ProcessIdentity-r11     CSI-ProcessIdentity-r11,
    csi-RS-IdentityNZP-r11      CSI-RS-IdentityNZP-r11,
    csi-IM-Identity-r11         CSI-IM-Identity-r11,
    p-C-AndAntennaInfoDedList-r11  SEQUENCE  (SIZE  (1..2))  OF  P-C-
AndAntennaInfoDed-r11,
    cqi-ReportBothPS-r11        CQI-ReportBothPS-r11           OPTIONAL,    -- Need OR
    cqi-ReportPeriodicId-r11    INTEGER (0..maxCQI-Ext-r11)    OPTIONAL,    -- Need OR
    cqi-ReportAperiodicPS-r11   CQI-ReportAperiodicPS-r11      OPTIONAL,    -- Need OR
    Flag_Restricted_CSI-IM measurement    Boolean              OPTIONAL,
    ...
}
``` example, for feedback modes associated with periodic CSI (i.e. PUCCH mode 2-0 and 2-1), the UE applies non-restricted interference measurement. On the other hand, for feedback modes associated with aperiodic CSI (i.e., PUSCH mode 2-20, 2-2, 3-0, 3-1, and 3-2), restricted interference measurement applies.

In one embodiment, a UE is configured to report first and second CSI reports. The UE is further configured to perform restricted interference measurement for the first CSI feedback and unrestricted interference measurement for the second CSI feedback. In another embodiment, the restriction applies only in the time domain. When the interference measurement is restricted, the UE measures interference across the full DL bandwidth in the designated subframes only. In another example, the restriction applies only in the frequency domain. When the interference measurement is restricted, the UE measures interference within the subband(s) without time restriction. In another alternative, the restriction applies both in the time and frequency domains. When the restriction applies, the UE measures interference within the subband(s) in the designated subframes.

In one example, the first CSI feedback reporting is configured by a first CSI process configuration, and the second CSI feedback reporting is configured by a second CSI process configuration.

In another embodiment, for selected aperiodic CSI feedback modes (e.g., for PUSCH based 3-2 aperiodic feedback mode), the UE may be configured to feed back the first and second CSI reports together. It may be difficult to justify PUSCH 3-2 feedback payload without corresponding gains, so a second CSI feedback is for MU-CQI. The eNB may obtain accurate CQI using any particular form of precoding (e.g., ZF precoding), since the effect of precoding may be reflected on CSI-IM resources. In this embodiment, in one example, the two CSI reporting is implemented according to a single joint CSI process as illustrated in Table 12 below. In this example, an eNB may reflect co-channel interference on the CSI-IM measurement.

the selected aperiodic CSI feedback modes (e.g., PUSCH mode 3-2) are configured. Even if csi-IM-Identity2-r11 is configured, the state of the csi-IM-Identity2-r11 is not used for changing UE behaviors for periodic CSI reporting.

When csi-IM-Identity2-r11 is configured, the aperiodic CSI calculation reporting for the PUSCH reporting is according to the following. The first CSI is calculated/reported based on the NZP CSI-RS configuration (e.g., corresponding to csi-RS-IdentityNZP-r11) and CSI-IM config1 (e.g., corresponding to csi-IM-Identity1-r11), where the interference is measured without resource restriction according to CSI-IM config1. Additionally, the second CSI is suitable for MU and is calculated/reported based on the NZP CSI-RS configuration and CSI-IM config2 (e.g., corresponding to csi-IM-Identity1-r12), where the interference is measured with resource restriction according to CSI-IM config2.

On the PUSCH report, the first CSI comprises $N_{sb}$ pairs (e.g., subband PMI, subband CQI), and the second CSI also comprises $N_{sb}$ pairs (e.g., subband PMI, subband CQI), and the first and the second CSI are jointly encoded.

The CQI estimation configuration for the two CSI reports is illustrated in FIG. 5. CQI for the first CSI report is calculated with interference measurement based on CSI-IM Config 1 505 configured by a CSI-IM configuration corresponding to csi-IM-Identity1-r11; CQI for the first CSI report is calculated with interference measurement based on CSI-IM Config 1 505 configured by a CSI-IM configuration corresponding to csi-IM-Identity2-r11. In some examples, the UE may perform an unrestricted interference measurement for the first CSI, and the UE may perform a subband restricted interference measurement for the second CSI.

In one example, the CQI calculation/reporting for the second CSI report is a delta CQI to the CQI for the first CSI report. This example may reduce CQI reporting overhead. In another example, CQI calculation/reporting for the first and the second CSI reports are absolute (e.g., normal) CQI (i.e., no CQI compression is applied for neither of the CQIs) for simplicity.

TABLE 12

```
CSI-Process ::=   SEQUENCE {
   csi-ProcessIdentity-r11      CSI-ProcessIdentity-r11,
   csi-RS-IdentityNZP-r11       CSI-RS-IdentityNZP-r11,
   csi-IM-Identity1-r11         CSI-IM-Identity-r11,
   csi-IM-Identity2-r11         CSI-IM-Identity-r11,       conditioned on PUSCH mode 3-2.
   p-C-AndAntennaInfoDedList-r11   SEQUENCE      (SIZE      (1..2))      OF      P-C-
AndAntennaInfoDed-r11,
   cqi-ReportBothPS-r11         CQI-ReportBothPS-r11              OPTIONAL,    -- Need OR
   cqi-ReportPeriodicId-r11     INTEGER (0..maxCQI-Ext-r11)       OPTIONAL,    -- Need OR
   cqi-ReportAperiodicPS-r11    CQI-ReportAperiodicPS-r11         OPTIONAL,    -- Need OR
   ...
}
```

The CSI-Process configuration IE above includes a new field, csi-IM-Identity2-r11, as well as csi-IM-Identity1-r11 for the CSI-IM. csi-IM-Identity2-r11 may alternatively be configured in aperiodic CSI reporting configuration (e.g., cqi-ReportAperiodicPS-r11 or equivalent) when configuring PUSCH mode 3-2.

For periodic CSI reporting, the UE derives a single type of CSI according to the periodic CSI configuration, based on the NZP CSI-RS configuration (e.g., corresponding to csi-RS-IdentityNZP-r11) and CSI-IM config1 (e.g., corresponding to csi-IM-Identity1-r11), where the interference is measured in the full bandwidth according to CSI-IM config1. In one example, csi-IM-Identity2-r11 may be configured only when In one example, a single RI is reported for the CSI process, where the single RI is calculated according to the first CSI, which is for SU-CQI. For the second CSI, the RI is not reported. In another example, the second CSI (i.e., PMI/CQI) is calculated according to the RI for the first CSI. In another example, the second CSI is calculated according to an implicit assumption that the RI is equal to a constant (e.g., 1). In another example, two separate RIs are calculated/reported for the first and the second CSI for the CSI process.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing interference measurements by a user equipment (UE) in a wireless communication system, the method comprising:
   identifying a first channel state information (CSI) interference measurement (IM) configuration for the UE to perform interference measurement as a function of the total number of frequency resources configured for CSI-IM;
   determining whether or not the first CSI-IM configuration includes a subset of a total number of frequency resources configured for CSI-IM in the wireless communication system;
   performing a first measurement of interference based on the identified first CSI-IM configuration;
   sending a first CSI feedback based on the first measured interference,
   identifying a second CSI-IM configuration for the UE to perform interference measurement based on the subset of frequency resources configured for CSI-IM;
   performing a second measurement of interference based on the subset of frequency resources configured for CSI-IM; and
   sending a second CSI feedback based on the second measurement of interference.

2. The method of claim 1, wherein the subset of a total number of frequency resources configured for CSI-IM corresponds to at least one subband of downlink system bandwidth, the method further comprising:
   determining whether to perform subband based interference measurements based on a signal received from a base station.

3. The method of claim 1, wherein whether the UE is to use the subset of frequency resources or the total number of frequency resources to perform interference measurement is included as part of a CSI process definition.

4. The method of claim 1 further comprising:
   determining whether to perform interference measurements based on all downlink subframes or only a portion of the downlink subframes to form a subframe determination; and
   performing interference measurement based on the subframe determination,
   wherein whether to perform interference measurements based on all downlink subframes or only a portion of the downlink subframes is included in a CSI process definition.

5. An apparatus of a user equipment (UE) capable of performing interference measurements in a wireless communication system, the apparatus comprising:
   a controller configured to identify a first channel state information (CSI) interference measurement (IM) configuration for the UE to perform interference measurement as a function of the total number of frequency resources configured for CSI-IM, determine whether or not the first CSI-IM configuration includes a subset of a total number of frequency resources configured for CSI-IM in the wireless communication system, and perform a first measurement of interference based on the identified first CSI-IM configuration;
   a transmitter configured to send a first CSI feedback based on the first measured interference;
   the controller further configured to identify a second CSI-IM configuration for the UE to perform interference measurement based on the subset of frequency resources configured for CSI-IM and perform a second measurement of interference based on the subset of frequency resources configured for CSI-IM; and
   the transmitter further configured to send a second CSI feedback based on the second measurement of interference.

6. The apparatus of claim 5, wherein the subset of a total number of frequency resources configured for CSI-IM corresponds to at least one subband of downlink system bandwidth, and wherein the controller is configured to determine whether to perform subband based interference measurements based on a signal received from a base station.

7. The apparatus of claim 5, wherein whether the UE is to use the subset of frequency resources or the total number of frequency resources to perform interference measurement is included as part of a CSI process definition.

8. The apparatus of claim 5, wherein the controller is configured to determine whether to perform interference measurements based on all downlink subframes or only a portion of the downlink subframes to form a subframe determination, and perform interference measurement based on the subframe determination, wherein whether to perform interference measurements based on all downlink subframes or only a portion of the downlink subframes is included in a CSI process definition.

9. A method for signaling interference measurements to be made by a user equipment (UE) in a wireless communication system, the method comprising:
   sending a signal indicating a first channel state information (CSI) interference measurement (IM) configuration for the UE to perform interference measurement as a function of the total number of frequency resources configured for CSI-IM, wherein the first CSI-IM configuration includes an indication of whether the UE is to use a subset of a total number of frequency resources configured for CSI-IM in the wireless communication system;
   receiving a first CSI feedback based on the measured interference associated with the first CSI-IM configuration;
   indicating a second CSI-IM configuration for the UE to perform interference measurement based on the subset of frequency resources configured for CSI-IM; and
   receiving second CSI feedback based measured interference associated with the second CSI-IM configuration.

10. The method of claim 9, wherein the subset of a total number of frequency resources configured for CSI-IM corresponds to at least one subband of downlink system bandwidth.

11. The method of claim 9, wherein whether the UE is to use the subset of frequency resources or the total number of frequency resources to perform interference measurement is included as part of a CSI process definition.

12. The method of claim 9 further comprising:
   indicating whether to perform interference measurements based on all downlink subframes or only a portion of the downlink subframes; and
   receiving feedback based on interference measurement associated with the subframe indication,
   wherein whether to perform interference measurements based on all downlink subframes or only a portion of the downlink subframes is included in a CSI process definition.

13. An apparatus for signaling interference measurements to be made by a user equipment (UE) in a wireless communication system, the apparatus comprising:
   a transmitter configured to send a signal indicating a first channel state information (CSI) interference measurement (IM) configuration for the UE to perform interference measurement as a function of the total number of frequency resources configured for CSI-IM, wherein the first CSI-IM configuration includes an indication of whether the UE is to use a subset of a total number of frequency resources configured for CSI-IM in the wireless communication system;

a receiver configured to receive a first CSI feedback based on the measured interference associated with the first CSI-IM configuration;

the transmitter further configured to indicate a second CSI-IM configuration for the UE to perform interference measurement based on the subset of frequency resources configured for CSI-IM; and the receiver is configured to receive second CSI feedback based measured interference associated with the second CSI-IM configuration.

14. The apparatus of claim 13, wherein the subset of a total number of frequency resources configured for CSI-IM corresponds to at least one subband of downlink system bandwidth.

15. The apparatus of claim 13, wherein whether the UE is to use the subset of frequency resources or the total number of frequency resources to perform interference measurement is included as part of a CSI process definition.

16. The apparatus of claim 13, wherein:

the transmitter is configured to indicate whether to perform interference measurements based on all downlink subframes or only a portion of the downlink subframes; and the receiver is configured to receive feedback based on interference measurement associated with the subframe indication, wherein whether to perform interference measurements based on all downlink subframes or only a portion of the downlink subframes is included in a CSI process definition.

* * * * *